Feb. 19, 1929.  1,702,982
H. W. C. SCHRÖDER
APPARATUS FOR USE IN ADMINISTERING GASES, VAPORS, AND THE LIKE
Filed June 8, 1923

Inventor
Hans Wilhelm Christian Schröder
By James L. Norris
Attorney

Patented Feb. 19, 1929.

1,702,982

UNITED STATES PATENT OFFICE.

HANS WILHELM CHRISTIAN SCHROEDER, OF LUBECK, GERMANY ASSIGNOR TO ALEXANDER BERNHARD DRÄGER, OF FINKELBERG, LUBECK, GERMANY, ELFRIEDE DRÄGER ADMINISTRATRIX OF SAID ALEXANDER BERNHARD DRÄGER, DECEASED.

APPARATUS FOR USE IN ADMINISTERING GASES, VAPORS, AND THE LIKE.

Application filed June 8, 1923, Serial No. 644,225, and in Germany September 26, 1922.

This invention relates to a mixing and measuring valve for use in apparatus designed for administering gases, vapors and the like, particularly in simultaneously administering two or more different gases &c., and has for one of its objects to improve the valve disclosed in my U. S. Patent No. 1,527,927, granted February 24, 1925.

Since the apparatus forming the subject-matter of my said patent is primarily intended for the administration of anæsthetics, ease of inspection and the possibility of using the apparatus quickly with accurate measurement of the anæsthetic are important conditions. Moreover the practice of anæsthesia has shown that the scope of utility of the apparatus is extended by simple selective adjustment thereof so that it may be utilized to administer, for example, air or oxygen alone, or a mixture of gases, or a mixture of gases with the addition of a further anæsthetic for example ether, or ether alone. By the present invention the conditions before referred to are efficiently fulfilled.

In the accompanying drawing:—

Figure 1:
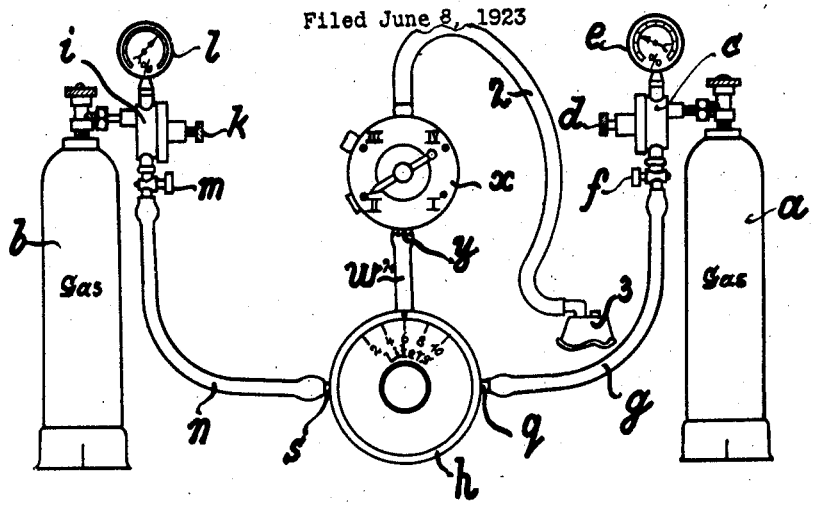
Figure 1 is an elevation of a complete apparatus embodying a mixing and measuring valve constructed according to the invention.
Figure 2:
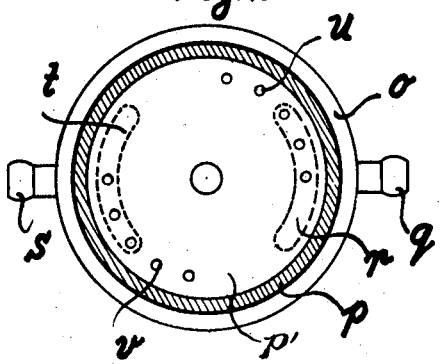
Figure 2 is a view, on a larger scale, illustrating the valve partly in section taken on a vertical plane crossing its axis and passing through the mixing chamber.
Figure 3:
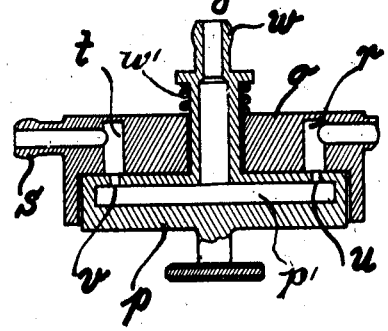
Figure 3 shows the said valve in central transverse section.

The steel cylinder $a$ contains a gas having an anæsthetic action (for example laughing gas, carbonic acid, acetylene, or the like) and the steel cylinder $b$ contains a revivifying gas (for example air or oxygen). By means of a pressure reducing valve $c$, regulating screw $d$, pressure gauge $e$ and stop cock $f$ the pressure of the gas delivered from the cylinder $a$ may be adjusted according to requirements and the gas is supplied at this pressure through the pipe $g$ to the mixing and measuring valve $h$. The pressure of the gas delivered from the cylinder $b$ may likewise be regulated by means of the pressure reducing valve $i$, regulating screw $k$, pressure gauge $l$, cock $m$, and such gas is supplied to the valve $h$ through the pipe $n$. By means of the said valve $h$ which is shown in detail in Figures 2 and 3, more or less of each of the gases is measured out, for example in quantities of 2, 4, 6, 8 or 10 litres per minute, according to requirements or breathing capacity of the patient. The valve $h$ consists of a fixed body $o$ and a rotatable cap or member $p$, the relatively movable engaging surfaces of which are caused to abut in an airtight manner one against the other. The gas from the cylinder $a$ flows through the nipple $q$ into the arcuate chamber $r$, and the gas from the cylinder $b$ flows through the nipple $s$ into the arcuate chamber $t$ of the body $o$. In the wall of the cap which abuts against the member $o$ and opposite the chambers $r$ and $t$ are two rows of orifices $u$ and $v$ which are arranged concentrically with the axis of rotation of the valve. The number of the orifices corresponds to the number of stages in litre volumes. The orifices $u$ for the gas from the cylinder $a$ are of equal size, as are likewise the orifices $v$ for the gas from the cylinder $b$. For the first range of quantities of gases to be mixed, for example two litres, the cap $p$ is rotated to bring one orifice of each of its two rows of orifices over or opposite to each of the chambers $r$ and $t$; for the second range of quantities of gases, for example four litres, two of each of said two rows or orifices are brought opposite each of said chambers and so on. Both gases mix in the hollow space $p'$ in the cap and the mixture is delivered, through the axial passageway of the spindle $w$ of the cap $p$, to a branch $w^2$ to the multiple way cock $x$, which may be of any suitable form, and thence through the tube 2 to the inhaling mask 3. The spindle $w$ of the cap $p$ extends through and is rotatable in the part $o$ of the valve and an expansive spring $w'$ surrounding spindle $w$ maintains the cap $p$ in intimate sealing contact with the body $o$. The arrangement of separate orifices and their uniform arrangement makes it possible to use only a single scale on each of the pressure gauges $e$ and $l$ for determining the percentage of each gas delivered according to the adjustment of the pressure in the reducing valves $c$ and $i$. The total volume of gas required for breathing is therefore measured out by the valve $h$ and the percentage of the gases to the total volume is measured independently thereof by adjusting the working pressure according to a scale graduated from 0 to 100 on the pressure gauges $e$ and $l$. To rapidly adjust the pressure other suitable appliances, for example eccentric levers, may be provided instead of the regulating screws $d$ and $k$.

The advantages of the improved apparatus are obvious; chief among them being the rapidity and accuracy with which the apparatus may be adapted to meet all conditions which have to be taken into account in the administration of an anæsthetic.

I claim:

The herein-described valve, including a disk-shaped body having a circular recess in one free face thereof with diametricaly disposed inlet and outlet ports leading thereto and through the main face of the recess, said body also being provided with a central opening therethrough, a hollow disk having two series of ports through one face and in communication with the chamber thereof, a hollow stem concentrically of and integral with the hollow disk and in communication with the chamber, said stem being mounted for rotation within the central opening of the first disk, an operating stem projecting from the outer face of the second disk for oscillating the disk to bring the ports thereof in series registration with the ports of the first disk, and a spring mounted upon the stem and engaging the first disk to hold the disk resiliently seated relatively to each other.

HANS WILHELM CHRISTIAN SCHRÖDER.